United States Patent
Tang et al.

(10) Patent No.: US 11,393,218 B2
(45) Date of Patent: Jul. 19, 2022

(54) OBJECT DETECTION METHOD AND DEVICE

(71) Applicant: BOE TECHNOLOGY GROUP CO., LTD., Beijing (CN)

(72) Inventors: Xiaojun Tang, Beijing (CN); Haijun Su, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 796 days.

(21) Appl. No.: 16/097,736

(22) PCT Filed: Mar. 14, 2018

(86) PCT No.: PCT/CN2018/078973
§ 371 (c)(1),
(2) Date: Oct. 30, 2018

(87) PCT Pub. No.: WO2018/233325
PCT Pub. Date: Dec. 27, 2018

(65) Prior Publication Data
US 2021/0224558 A1    Jul. 22, 2021

(30) Foreign Application Priority Data
Jun. 22, 2017    (CN) .......................... 201710479970.8

(51) Int. Cl.
*G06V 20/58*    (2022.01)
*G06K 9/62*     (2022.01)
(Continued)

(52) U.S. Cl.
CPC ........... *G06V 20/58* (2022.01); *G06K 9/6228* (2013.01); *G06K 9/6232* (2013.01);
(Continued)

(58) Field of Classification Search
None
See application file for complete search history.

(56) References Cited

U.S. PATENT DOCUMENTS

| | | | | |
|---|---|---|---|---|
| 8,805,081 B2* | 8/2014 | Chotard | ............... | G06K 9/6257 |
| | | | | 382/190 |
| 2006/0257017 A1* | 11/2006 | Luo | ...................... | G06K 9/6857 |
| | | | | 382/159 |

(Continued)

FOREIGN PATENT DOCUMENTS

| | | |
|---|---|---|
| CN | 104143081 A | 11/2014 |
| CN | 104504365 A | 4/2015 |

(Continued)

OTHER PUBLICATIONS

Rapid Object Detection using a Boosted Cascade of Simple Features. Viola et al. (Year: 2001).*

(Continued)

*Primary Examiner* — Delomia L Gilliard
(74) *Attorney, Agent, or Firm* — Nath, Goldberg & Meyer; Joshua B. Goldberg

(57) ABSTRACT

Embodiments of the disclosure provide an object detection method and device. The object detection method includes: extracting features of an image; classifying the image by each level of classifiers of a cascade classifier according to the features of the image, and calculating a classification score of the image in each level of the classifiers of the cascade classifier according to a classification result; and calculating, according to the classification score, a cascade score of the image in a corresponding level of the cascade classifier, comparing the cascade score in the corresponding level with a cascade threshold of the corresponding level, and judging the presence of an object in the image according to a comparison result.

19 Claims, 1 Drawing Sheet

(51) Int. Cl.
*G06N 5/00* (2006.01)
*G06V 10/75* (2022.01)

(52) U.S. Cl.
CPC ......... *G06K 9/6257* (2013.01); *G06N 5/003* (2013.01); *G06V 10/751* (2022.01)

(56) References Cited

U.S. PATENT DOCUMENTS

| | | | |
|---|---|---|---|
| 2010/0232686 | A1 | 9/2010 | Dewan et al. |
| 2019/0228527 | A1* | 7/2019 | Ramirez .................. G06T 7/41 |
| 2019/0279040 | A1* | 9/2019 | Park .................. G06K 9/00973 |

FOREIGN PATENT DOCUMENTS

| | | |
|---|---|---|
| CN | 104504366 A | 4/2015 |
| CN | 104850818 A | 8/2015 |
| CN | 105718866 A | 6/2016 |
| CN | 106022254 A | 10/2016 |
| CN | 106599856 A | 4/2017 |
| CN | 106682598 A | 5/2017 |

OTHER PUBLICATIONS

Boosting-Based Face Detection and Adaptation. Zhang et al. (Year: 2010).*

Viola P. et al., "Rapid object detection using a boosted cascade of simple features" Proceedings 2001 IEEE Conference on Computer Vision and Pattern Recognition. CVPR 2001. Kauai, Hawaii, Dec. 8-14, 2001.

Cha Zhang and Zhengyou Zhang Ed—Cha Zhang and Zhengyou Zhang: "Boosting-Based Face Detection and Adaptation", Sep. 1, 2010 (Sep. 1, 2010), Boosting-Basedface Detection and Adaptation(Book Series: Synthesis Lectures on Computer Vision), Morgan & Claypool Publishers Series, pp. 140PP, XP008130361, ISBN 978-1-60845-133-3.

Extended European Search Report dated Feb. 17, 2021 for application No. EP18789304.5.

International Search Report dated May 25, 2018 corresponding to application No. PCT/CN2018/078973.

First Office Action dated May 5, 2019 corresponding to Chinese application No. 201710479970.8.

* cited by examiner

OBJECT DETECTION METHOD AND DEVICE

CROSS-REFERENCE TO RELATED APPLICATIONS

This application is entering the national phase of PCT Application No. PCT/CN2018/078973 filed on Mar. 14, 2018, titled "OBJECT DETECTION METHOD AND DEVICE" in the Chinese Intellectual Property Office, the disclosure of which is incorporated herein by reference.

FIELD OF THE INVENTION

The present disclosure relates to an object detection method and device.

BACKGROUND

Pedestrian detection is an important research direction in the field of computer vision. In general, pedestrian detection technology can detect the presence of pedestrians in an image by analyzing the image. Pedestrian detection technology has a wide range of applications in the fields of driving assistance device, intelligent monitoring, and intelligent robots. For example, the driver assistance system can use the pedestrian detection technology to detect the pedestrians in front of the vehicle and remind the driver to avoid; the intelligent monitoring system can use the pedestrian detection technology to detect the pedestrians in a monitoring screen, so as to analyze behaviors of the pedestrians and track suspicious persons; and the intelligent robot can use the pedestrian detection technology to detect the pedestrians in the surrounding environment to automatically avoid or follow.

SUMMARY

In an aspect of the disclosure, according to an embodiment of the present disclosure, there is provided an object detection method, comprising steps of: extracting features of an image; classifying the image by each level of classifiers of a cascade classifier according to the features of the image, and calculating a classification score of the image in each level of the classifiers of the cascade classifier according to a classification result; and calculating, according to the classification score, a cascade score of the image in a corresponding level of the cascade classifier, comparing the cascade score in the corresponding level with a cascade threshold of the corresponding level, and judging the presence of an object in the image according to a comparison result.

Optionally, the step of classifying the image by each level of classifiers of a cascade classifier, comprises: classifying the image by each level of classifiers of a cascade classifier in a random forest method.

Optionally, the step of classifying the image by each level of classifiers of a cascade classifier according to the features of the image and calculating a classification score of the image in each level of the classifiers of the cascade classifier according to a classification result, comprises: in the classifier, selecting through a branch node a pair of features of the image, comparing a difference between feature values of the pair of features with a selected node threshold, assigning the image into a lower-level node of the branch node, until the image is assigned into a leaf node of the classifier, and using a node score of the leaf node as the classification score of the image in the classifier; and the step of calculating, according to the classification score, a cascade score of the image in a corresponding level of the cascade classifier, comparing the cascade score in the corresponding level with a cascade threshold of the corresponding level, and judging the presence of an object in the image according to a comparison result, comprises: comparing the cascade score of the image in each level of the cascade classifier with a corresponding cascade threshold, and in the condition where all of the cascade scores are greater than or equal to the corresponding cascade threshold, determining that there is an object in the image.

Optionally, in the condition where the difference between the feature values is greater than or equal to the selected node threshold, the image is assigned into a lower-level right node of the branch node; and in the condition where the difference between the feature values is lower than the selected node threshold, the image is assigned into a lower-level left node of the branch node.

Optionally, the step of extracting the features of the image comprise: converting the image into a standard image having a selected resolution and a color channel; and extracting the features from the standard image using a feature extraction algorithm.

Optionally, the feature extraction algorithm comprises an HOG algorithm, an LUV color and an LBP algorithm.

Optionally, before extracting the features of the image, the method further comprises: sequentially training each of a plurality of classifiers by using sample images, wherein the sample images include a plurality of positive sample images having the object and a plurality of negative sample images having no object; forming the plurality of classifiers into the cascade classifier according to an order of training; and training the cascade classifier according to a verified sample image having the object.

Optionally, the training process for each classifier comprises: calculating a weight value of each of the sample images in the classifier; placing the sample image to a root node of the classifier, wherein a depth of the root node is 1; selecting an unprocessed node for processing the sample image, wherein a node score of the node and a weight value ratio of the positive sample image are calculated according to the positive sample image and the weight value of positive sample image the and the negative sample image and the weight value of negative sample image; in the condition where a depth of the node does not reach a predetermined value and the weight value ratio of the positive sample does not reach a preset condition, randomly extracting a plurality of pairs of features for each of the sample images in the node by using the same feature extraction method; selecting a pair from the plurality of pairs of features as a temporary feature pair to set a temporary threshold; in the condition where a difference between the feature values of the temporary feature pairs of the sample image in the node is greater than or equal to the temporary threshold, assigning the sample image into a right set; and in the condition where a difference between the feature values of the temporary feature pairs of the sample image in the node is less than the temporary threshold, assigning the sample image into a left set; calculating a temporary score of the image in the node according to the positive sample image and the weight value of positive sample image and the negative sample image and the weight value of the negative sample image in the left and right sets; dividing a left node and a right node in a lower level of the node, a depth of the lower level of the node being the depth of the node with 1 added; and using the selection method of the temporary feature pair corresponding to the maximum value of the temporary score as a selection method of a feature pair of the current node, and using the temporary threshold corresponding to the maximum value of the temporary score as a node threshold of the current node, to assign the sample image of the left set having the maximum value of the temporary score into a lower-level left node of the node, and to assign the sample image of the right set into a lower-level right node of the node; and repeating the above steps until the sample image is processed in all nodes.

Optionally, the weight value ratio of positive sample image is $$\text{RATIO} = \frac{WPS}{WPS + WNS},$$

and the node score is SCORE=max(−a,min(a,a×ln(RATIO/ 1−RATIO))), wherein a is a coefficient more than 0, WPS is a sum of the weight values of the positive sample images in the node, and WNS is a sum of the weight values of the negative sample images in the node; the predetermined condition of the weight ratio of positive sample image is RATIO<TH1 or RATIO>1−TH1, wherein TH1 is the predetermined threshold; and the temporary score is SCORE2=|WLP−WLN−WRP+ WRN|, wherein WLP is the sum of the weight values of the positive sample images in the left set, WLN is the sum of the weight values of the negative sample images in the left set, WRP is the sum of the weight values of the positive sample images in the right set, and WRN is the sum of the weight values of the negative sample images in the right set.

Optionally, in the training of the first classifier, an initial weight value of any positive sample images is set to be $$WP_1 = \frac{1}{2 \times NP},$$

and an initial weight value of any negative sample images is set to be $$WN_1 = \frac{1}{2 \times NN},$$

wherein NP is a total number of the positive sample images, and NN is a total number of the negative sample images; and in the training of the k-th classifier, the weight value of the sample image is calculated by a Boost algorithm, wherein k is greater than or equal to 2.

Optionally, in the training of the k-th classifier, the calculation of the weight value of the sample image by the Boost algorithm comprises calculating the weight value of the sample image by a SoftBoost algorithm, and further comprises: calculating a speech right ALPHA of the k−1th trained classifier, ALPHA=MAX (−a,min(a,0.1×a×ln((1− ERRWT)/ERRWT))), wherein ERRWT is a sum of weighting errors ERRW of all the leaf nodes of the trained k−1th classifier, ERRW=ERR×(WPS+WNS), ERR=min(RATIO, 1−RATIO); calculating a detection score $H_k$ of the sample image in the training of the k-th classifier, $H_k=H_{k-1}+h_{k-1}\times$ ALPHA, wherein $h_{k-1}$ is the classification score of the sample image in the k−1th trained classifier, $H_{k-1}$ is the detection score of the sample image in the k−1th trained classifier, and $H_1$ is 0; for the positive sample image, setting the initial weight to be $WP'_k=\exp(-H_k)/NP/2$ in the training of the k-th classifier; for the negative sample image, setting the initial weight to be $WN'_k=\exp(H_k)/NN/2$ in the training of the k-th classifier; calculating a sum $W'_k$ of the initial weights of all sample images in the training of the k-th classifier; and dividing the initial weight of each of sample images in the k-th classifier by the sum of the initial weights to obtain a weight value of each of sample images in the classifier.

Optionally, a=5.

Optionally, the step of training the cascade classifier according to a verified sample image having the object comprises: obtaining the cascade threshold in each level of the cascade classifier according to the verified sample image having the object, and further comprises:

Optionally, calculating a cascade score of each of verified sample images in each level of the cascade classifier; and obtaining the cascade threshold in each level of the cascade classifier, wherein the cascade threshold is a maximum value in the cascade thresholds allowing a miss detection rate of verified sample image at the corresponding level of the cascade classifier to be lower than a set value, and wherein the miss detection rate is a probability of judging there is no object in the verified sample image.

In another aspect of the disclosure, according to an embodiment of the present disclosure, there is provided an object detection device, including: an extractor, configured to extract features of an image; and a cascade classifier, including a plurality of classifiers, wherein each of the plurality of classifiers is configured to classify the image according to features of the image, and calculate a classification score of the image in each level of the classifiers of the cascade classifier according to a classification result, and the cascade classifier is configured to calculate, according to the classification score, a cascade score of the image in a corresponding level of the cascade classifier, compare the cascade score in the corresponding level with a cascade threshold of the corresponding level, and judge the presence of an object in the image according to a comparison result.

Optionally, the classifier includes a plurality of branch nodes and a plurality of leaf nodes; the branch node is configured to select a pair of features of the image, compare a difference between feature values of the pair of features with a set node threshold, and assign the image into a lower-level node of the branch node according to a comparison result; and the leaf node is configured to calculate a node score at the leaf node of the image which is assigned into the leaf node as a classification score of the image in the classifier.

Optionally, a lower-level node corresponding to the branch node includes a lower-level right node and a lower-level left node; and the branch node is configured to, in the condition where the difference between the feature values is greater than or equal to the set node threshold, assign the image into the lower-level right node of the branch node; and in the condition where the difference between the feature values is lower than the selected node threshold, the image is assigned into the lower-level left node of the branch node.

Optionally, the cascade classifier is formed by cascading a plurality of classifiers in a predetermined order, and is configured such that a cascade score of the image in each level of the cascade classifier is equal to a sum of the classification scores of the image in a current level and previous levels.

In still another aspect of the disclosure, according to an embodiment of the present disclosure, there is provided a driving assistance device including the object detection device as set forth.

In still yet another aspect of the disclosure, according to an embodiment of the present disclosure, there is provided an electronic device including at least one processor configured to operate computer instructions to execute at least one step in the object detection method as set forth.

In still yet another aspect of the disclosure, according to an embodiment of the present disclosure, there is provided a computer readable storage device, configured to store computer instruction operable by a processor, the computer instruction being executed by the processor to perform at least one step in the object detection method as set forth.

DETAILED DESCRIPTION OF THE EMBODIMENTS

In order to enable those skilled in the art to better understand the technical solutions of the present disclosure, the present disclosure will be further described in detail below in conjunction with the accompanying drawings and specific embodiments.

It will be understood that the term "object" as used herein refers to humans, animals, and other objects that can be detected by the object detection method described in this disclosure.

Figure 1:
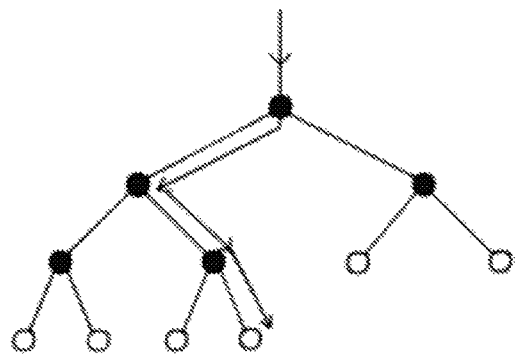
FIG. 1 is a block diagram schematically illustrating a structure of a classifier in an object detection method according to an embodiment of the present disclosure.
Figure 2:
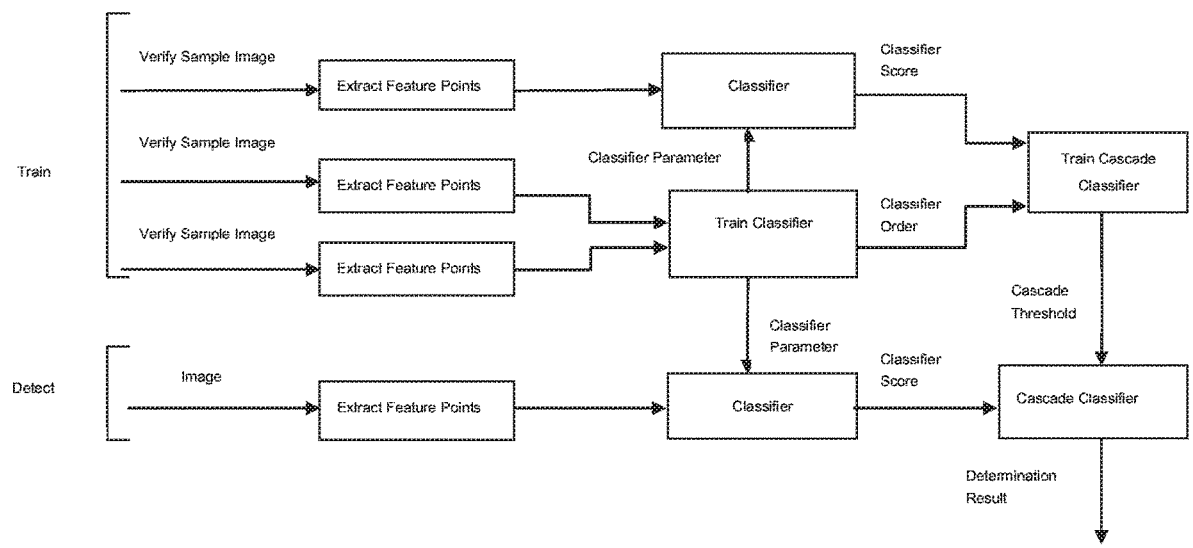
FIG. 2 is a diagram schematically illustrating an object detection method according to an embodiment of the present disclosure.

As shown in FIGS. 1 and 2, according to an embodiment of the present disclosure, there is provided an object detection method including steps of:

S11, extracting features of an image;

S12, classifying the image by each level of classifiers of a cascade classifier according to the features of the image, and calculating a classification score of the image in each level of the classifiers of the cascade classifier according to a classification result; and S13, calculating, according to the classification score, a cascade score of the image in a corresponding level of the cascade classifier, comparing the cascade score in the corresponding level with a cascade threshold of the corresponding level, and judging the presence of an object in the image according to a comparison result.

According to the object detection method of this embodiment, each level of the classifiers may classify the image by a differential channel and calculate the classification score. Since the differential channel classification is a weak classification, the object detection method may form a plurality of classifiers into a cascade classifier (i.e., constitute a random decision forest), and use the cascade classifier to judge the presence of the object in the image. In other words, results of multiple classifiers are used to comprehensively judge the presence of the object in the image. Therefore, the detection accuracy of the object detection method according to the embodiment of the present disclosure can be greatly improved with a high detection speed and a small amount of calculation required for detection.

As shown in FIGS. 1 and 2, in this embodiment, the object detection method is provided for detecting the presence of the object in the image.

In practical applications, multiple objects may be included in a single image. According to some embodiments, such an image is generally assigned into a plurality of small blocks, and then the presence of the object in each of the blocks is detected. Finally, detection results of the blocks are combined to determine the presence of the objects in the entire image, the number of the objects and the location of the objects (which may be determined by detecting the location of the small block having the object).

The object detection method according to this embodiment may classify the image by a plurality of classifiers (DCRDF classifiers) using differential channels, and calculate the classification score of the image in each level of classifiers; thereafter the cascade classifier formed by cascading the classifiers is used to calculate a plurality of cascade scores, and the presence of the object in the image can be judged based on these cascade scores.

The classifiers and the cascade classifiers can be obtained through training before the object is detected. The resulted classifiers and cascade classifier can be used for object detection. It should be understood that after the classifiers and the cascade classifier are obtained through training, the classifiers and the cascade classifier can be used to detect the object multiple times without having to retrain each time before the object detection is performed.

In some embodiments of the present disclosure, the object detection method of the embodiment includes following steps.

First, the step of training the classifiers and cascade classifiers includes: S21, sequentially training each of a plurality of classifiers by using sample images, wherein the sample images include a plurality of positive sample images having the object and a plurality of negative sample images having no object.

In other words, NP images which definitely have the objects are first selected as the positive sample images, and NN images which definitely have no object are selected as the negative sample images. Then these sample images are used to sequentially train multiple (for example, 4096) classifiers to obtain specific parameters (or classifier model) of each level of classifiers.

Optionally, the process of training each level of the classifiers specifically includes:

S2111, extracting features of sample images.

The processing of the image (including the sample image, the verified sample image, the actually judged image, etc.) is performed based on the features, and the features are obtained by feature extraction of the image. In order to train the classifier with the sample images, feature extraction is first performed on all sample images.

In some embodiments, the step of extracting features may specifically include: converting the image into a standard image having selected resolution and color channel; and extracting features from the standard image using a feature extraction algorithm.

For example, the image is first subjected to scaling and color conversion to be adjusted to a standard image with a specific resolution (such as 1024*768) and a specific color channel (such as RGB channel). Thus, each point in the image can be determined by its coordinates and color channel number, and the value of each point can be the component of the corresponding color channel (such as brightness or grayscale) at that point. After that, feature extraction is performed on the standard image by the feature extraction algorithm, thereby obtaining a plurality of features.

For example, the feature extraction algorithm includes the HOG algorithm (Histogram of Oriented Gridients, which calculates the statistical value of the direction information of the local image gradient), the LUV color (which converts the RBG color space to the LUV color space), and the LBP algorithm (Local Binary Patterns).

For example, some of the above algorithms can be combined. For example, features can be extracted from the image using LUV color features, in combination with the HOG algorithm and the LBP algorithm.

Of course, the feature extraction algorithms as mentioned herein are only some specific implementations of the embodiments of the present disclosure. It is also feasible to apply other algorithms to extract the features of the image.

In an embodiment of the present disclosure, the extracted features may be represented as feature points and feature regions. For convenience of description, the feature points are taken as an example for explanation.

Of course, it should be understood that after all the sample images are subjected to the feature extraction, the extracted features (or the extracted images) can be used for training the classifiers. In other words, it is not necessary to perform feature extraction separately when training each level of classifier, but the previously extracted features can be utilized.

S2112: calculating a weight value of each sample image in the current classifier.

For example, for the first trained classifier, it is assumed that an initial weight value of any positive sample image is $$WP_1 = \frac{1}{2 \times NP},$$

an initial weight value of any negative sample image is $$WN_1 = \frac{1}{2 \times NN}.$$

In other words, in the first trained classifier, the weight value of the sample image can be directly calculated by the number of the corresponding type of sample images. It should be understood that a sum of the weight values of all positive sample images at this time is ½, a sum of the weight values of all negative sample images is ½, and a sum of the weight values of all sample images (all positive sample images and all negative sample images) is 1.

For example, weight values of the sample images in other classifiers can be calculated from the parameters of the classifier that was previously trained.

S2113, placing all the sample images (extracted features of the sample images) to a root node, wherein a depth of the root node is 1.

As shown in FIG. 1, in the technical solution of this embodiment of the present disclosure, the classifier is configured to perform classification by using the differential channel.

Herein, the classifier is composed of a plurality of nodes, and the nodes are assigned into branch nodes and leaf nodes (each branch node and a plurality of lower-level nodes corresponding to the branch node can form a decision tree, and the node of the classifier not in connection with the lower-level node is a leaf node. Each classifier includes a multiple-layer and multiple-decision tree structure.)

Herein, each branch node includes at least two branch nodes of the next level (it is easy to understand that the branch node at the end corresponds to at least two leaf nodes).

Optionally, each branch node corresponds to two lower-level nodes on lower and right sides (as described above, the lower-level node may be a branch node or a leaf node), and is used to assign the image into the lower-level nodes. When classifying an image, the image first enters the first level of the branch nodes and is assigned into a lower-level node of the branch node. If the lower-level node has a further lower-level node, the image continues to be assigned along different paths according to this rule until reaching a leaf node without a lower-level node. At this point, the image is assigned into the leaf node. In FIG. 1, the solid circle represents the branch node, the hollow circle represents the leaf node, and the arrow represents the direction in which the image enters the node.

Since the classifier has not been established at this time, it is necessary to first establish a first-level branch node (root node) for the sample image, and assign all the sample images into the root node. Obviously, a depth level of the root node is 1, that is, the highest level of the branch node.

Here, the root node can be placed in a FIFO stack (first in first out stack) to process the nodes in the FIFO stack in sequence.

The process of training each level of the classifier further includes: S2114, judging the presence of unprocessed nodes, wherein if yes, proceeding to the next step, or if not, closing the training and forming the classifier by using all the processed nodes.

In other words, it is judged whether there are any unprocessed nodes in the stack, if yes, the next step is performed to process the unprocessed nodes, if not, the training has been completed and the process goes to step S2122 to form the classifier by using the processed nodes.

It should be understood that when the method first enters this step from step S2113, there is only one unprocessed root node in the stack, so the method necessarily proceeds to the next step.

The process of training each level of classifier further includes: S2115, selecting an unprocessed node for processing, wherein a node score of this node and a weight value ratio of the positive sample image are calculated according to the positive sample images and weight values thereof and the negative sample images and weight values thereof.

In other words, the node that is first entered at this time is selected sequentially from the FIFO stack for processing (the root node is necessarily first processed) in order to obtain the node score of the node and the weight value ratio of the positive sample images.

Herein, the ratio of weight values of the positive sample images is $$\text{RATIO} = \frac{WPS}{WPS + WNS},$$

and the node score is SCORE=max(a, min(a,a×ln(RATIO/ 1−RATIO))), wherein a is a coefficient greater than 0, WPS is a sum of the weight values of the positive sample images in the node, and WNS is a sum of the weight values of the negative sample images in the node.

In other words, there are some positive sample images and negative sample images in the node at this time (all sample images for the root node). In this step, the sum of weight values of the positive sample images and the sum of weight values of the negative sample images in the node are calculated, respectively, to obtain the total weight value WPS of the positive sample images and the total weight value WNS of the negative sample images in the node; and then a ratio of the total weight value WPS of the positive sample images in relation to the total weight values (WPS+WNS) of all sample images is calculated as the weight value ratio of the positive sample images.

In some embodiments of the present disclosure, the node score of the node is calculated from the weight value ratio of the positive sample images by the above formula, wherein a is a manually set coefficient the value of which may affect the classification score of the classifier.

In some embodiments of the present disclosure, a=5.

In the meantime, in some embodiments of the present disclosure, in order to calculate the weight value of the sample image in the other classifiers in the subsequent steps, a classification error ERR=min(RATIO,1−RATIO) of the node can also be calculated at this time, so that a weighting error ERRW=ERR×(WPS+WNS) of the node can be further calculated.

The process of training each level of classifier further includes: S2116, judging whether a depth of the node reaches a predetermined value, and judging whether the weight value ratio of the positive sample reaches a preset condition, wherein if at least one of the judgment results is YES, go to the step of judging the presence of unprocessed nodes, or if the judgment results are NO, go to the next step.

After processing the node, it can be judged whether the depth of the node reaches the predetermined value (for example, 5), that is, whether the number of levels of the classifiers reaches the predetermined value at this time.

At the same time, it is also necessary to judge whether the ratio of weight values of the positive sample images obtained above meets the preset condition. The preset condition is RATIO<TH1 or RATIO>1−TH1, wherein TH1 is a preset threshold. For example, the preset threshold may be 0.01.

If at least one of the judgment results is YES, it is indicated that the processing of the node is completed, and the node is no longer required to be divvied; if the judgment results are NO, it is indicated that the node needs to be assigned and then enters the next step.

The process of training each level of classifier further includes: S2117, randomly extracting a plurality of pairs of features for each of the sample images in the node, wherein the features in the different sample images are selected according to the same method.

In other words, a random selection method is first determined, which is configured to select a plurality of pairs (e.g., 10,000 pairs) of features from the images, and then utilize the method to select features from all sample images of the node. In this way, each individual sample image in the node is randomly selected with a plurality of pairs of features, but the feature pairs of different sample images in the node are selected in the same way.

It should be understood that while two features in a feature pair of a sample image are necessarily different, one feature may be in a plurality of different feature pairs.

The process of training each level of classifier further includes: S2118, selecting a pair from the plurality of pairs of features as a temporary feature pair to set a temporary threshold, if a difference between the feature values of the temporary feature pairs of the sample image in the node is greater than or equal to the temporary threshold, assigning the sample image into a right set, otherwise assigning the sample image into a left set.

In other words, a pair of features is randomly selected from a plurality of pairs of features (the selection methods of all sample images are the same), and a temporary threshold is set. Thus, in each sample image, the feature values of the pair of features F1 and F2 necessarily have a difference DF. The sample image can be classified by the relationship of the difference DF to the temporary threshold. If the difference DF of the feature values of a sample image is greater than or equal to the temporary threshold, the sample image is assigned into the right set, and otherwise the sample image is assigned into the left set. This process is equivalent to classifying the sample images in the node with the pair of features and temporary thresholds.

The process of training each level of classifier specifically includes: S2119, calculating a temporary score of the node according to the positive sample image and its weight value and the negative sample image and its weight value in the left and right sets.

After the left set and the right set are obtained, a sum of the weight value of the positive sample image and the weight value of the negative sample image is calculated to obtain a sum WLP of weight values of the positive sample images in the left, a sum WLN of the weight values of the negative sample image in the left set, a sum WRP of the weight values of the positive sample images in the right set, and a sum WRN of the weight values of the negative sample images in the right set, and the temporary score SCORE2=|WLP−WLN−WRP+WRN| can be obtained according to the sums of the weight values.

The process of training each level of classifier further includes: S2120, splitting a left node and a right node at a lower level of the current node, a depth of lower level of the node being the depth of the current node with 1 added; and using the selection method of the temporary feature pair corresponding to the maximum value of the temporary score as a selection method of a feature pair of the current node, and using the temporary threshold corresponding to the maximum value of the temporary score as a node threshold of the current node, to assign the sample image of the left set having the maximum value of the temporary score into a lower-level left node of the current node, and to assign the sample image of the right set into a lower-level right node of the current node.

In other words, two lower-level nodes are first split for the current node (the depth of the lower-level node is of course 1 more than the depth of the current node), and the two lower-level nodes are added to the FIFO stack. After that, the selection method of the feature pair and the node threshold of the node are determined, and the sample images that should be assigned into the left node and the right node are determined.

Obviously, when different feature pairs and temporary thresholds are selected, the positive sample image and the negative sample image assigned into the left set and the right set are different, such that the corresponding temporary scores are also different. There must be a maximum value in the temporary scores corresponding to all feature pairs and temporary thresholds. The feature pair corresponding to the maximum value of the temporary score is the optimal feature pair, and the selection method of the optimal feature pair is taken as the selection method of the feature pair at the current node. The temporary threshold corresponding to the maximum value of the temporary score is regarded as the optimal temporary threshold, and the optimal temporary threshold is taken as the node threshold at the current node. The sample images in the left set and the right set corresponding to the maximum value of the temporary score are assigned into a lower-level left node and a lower-level right node of the current node, respectively (which correspondingly classifies the sample images at the current node using the determined selection method of the feature pair and the node threshold).

Of course, to determine the above maximum value of the temporary score, it is actually necessary to repeat steps S2118 and S2119 continuously. The specific process will not be described here.

The process of training each level of the classifier specifically includes: S2121, returning to step S2114.

After step S2120, the current node splits out two lower-level nodes, and the sample images at the current node are also assigned into two respective lower-level nodes. Therefore, at this point the current node has been processed (without any sample images) and is thus moved out of the FIFO stack. The two split lower-level nodes enter another FIFO stack and have not yet been processed (with sample images). Therefore, after returning to the step of judging the presence of the unprocessed nodes, the lower-level nodes can continue to be processed.

Thus, the above process is repeated until no nodes need to be split and all nodes that have been split are processed.

The process of training each level of classifier specifically includes: S2122, using the processed nodes to establish a classifier.

After all the nodes in the FIFO stack are processed, a plurality of nodes with certain structures (including branch nodes and leaf nodes) are obtained, wherein each node has a determined node score, a node threshold, and a selection method of feature pair. Thus, these nodes can be used to form a classifier, and the training of the current classifier is completed.

The process of training each level of classifier further includes: S2123, calculating a weight value of each of the sample images in a next classifier to be trained, and then returning to step S2113 to start training the next classifier.

It should be understood that step S2123 is actually the starting step of the training of the classifier (except for the first trained classifier). However, since step S2123 is to utilize the parameters of the last trained classifier, it is explained here for ease of understanding.

Specifically, when k is greater than or equal to 2, a weight value of sample image in the k-th trained classifier can be calculated by the Softboost algorithm.

In other words, except for the first trained classifier, the weight values of the sample images in other classifiers are calculated according to the Softboost algorithm by the relevant parameters in the previous respective classifier, and the specific process is as follows.

(1) calculating a speech right ALPHA of the k−1th trained classifier, ALPHA=MAX (−a,min(a,0.1×a×ln((1−ERRWT)/ERRWT))) wherein ERRWT is a sum of the weighting errors ERRW of all the leaf nodes of the k−1th trained classifier.

As described above, a weighting error ERRW can be obtained by calculating each node of the currently completed trained classifier (k−1th trained classifier). The sum of the weighting errors of all leaf nodes is ERRWT. The speech right ALPHA of the classifier can be calculated by the ERRWT.

(2) calculating a detection score $H_k$ of the sample image in the k-th trained classifier, $H_k = H_{k-1} + h_{k-1} \times ALPHA$, wherein $h_{k-1}$ is the classification score of the sample image in the k−1th trained classifier, $H_{k-1}$ is the detection score of the sample image in the k−1th trained classifier, and $H_1$ is 0.

In other words, a detection score $H_k$ (the detection score of the k-th trained classifier is calculated according to the detection score of the k−2th trained classifier, and so on) of the sample image in the next trained classifier (k-th trained classifier) can be calculated, according to the speech right ALPHA of the currently trained classifier (k−1th trained classifier), and the detection score $H_{k-1}$ and the classification score $h_{k-1}$ of the sample image (i.e., the node score of the leaf node to which the sample image is finally assigned). Herein, the detection score $H_1$ of each of the sample images in the first trained classifier is set to zero.

(3) in the condition that the sample image is a positive sample image, an initial weight value in the k-th trained classifier is $WP'_k = \exp(-H_k)/NP/2$; in the condition that the sample image is a negative sample image, an initial weight value in the k-th trained classifier is $WN'_k = \exp(H_k)/NN/2$.

In other words, according to whether the sample image is a positive sample image or a negative sample image, the initial weight value $WP'_k$ or $WN'_k$ of the sample image in the k-th trained classifier is further calculated from the detection score $H_k$ of the sample image through the above formula.

(4) calculating a sum of the initial weight values of all the sample images in the k-th trained classifier.

In other words, the initial weight values ($WP'_k$ or $WN'_k$) of all the sample images in the k-th trained classifier are added to obtain the sum of the initial weight values.

(5) obtaining the weight value of each sample image in the classifier is obtained by dividing the initial weight value of each sample image in the k-th trained classifier by the sum of the initial weight values.

In other words, the initial weight values ($WP'_k$ or $WN'_k$) calculated above are divided by the sum $W'_k$ of the above initial weight values, respectively, thereby obtaining the weight value of each of the sample images in the k-th trained classifier. The weight value is normalized, so that the sum of the weight values of all the sample images should be 1.

The step of training the classifiers and the cascade classifier further includes: S22, forming the plurality of classifiers into the cascade classifier according to an order of training.

After the classifiers are obtained by training, they are formed into the cascade classifier in the order of training. For example, the k-th trained classifier is regarded as the k-th level of the cascade classifier.

Herein, the cascade score of the image sample in each level of the cascade classifier is equal to a sum of the classification scores of the image sample at this level and the previous levels of the classifiers. In other words, an image sample can be classified to obtain a classification score in each level of the cascade classifier, and the cascade score of the k-th level of the cascade classifier is equal to the sum of the classification scores of first level, second level . . . up to k-th level of classifiers.

The step of training the classifiers and the cascade classifier further includes: S23, calculating a cascade threshold of each level of the cascade classifier according to verified sample image having the object.

Each level of the cascade classifier is also provided with a cascade threshold. If the cascade score of the image at the level is greater than or equal to the cascade threshold, it is determined that the image does not have an object in the level; and if the cascade score of the image at the level is less than the cascade threshold, it is determined that the image has is an object at the level.

In this step, a plurality of verified sample images that are determined to have the object are selected for processing in the cascade classifier to determine cascade thresholds at each level of the cascade classifier. Specifically, this step may include:

calculating a cascade score of each verified sample image at each level of the cascade classifier; and setting a cascade threshold of each level of the cascade classifier, wherein the cascade threshold is a maximum value in the cascade thresholds allowing a miss detection rate of verified sample image at the corresponding level of the cascade classifier to be lower than a set value, and wherein the miss detection rate is a probability of judging there is no object in the verified sample image.

In other words, the features of each verified sample image are extracted, and the verified sample images are classified by the previously trained classifiers to obtain corresponding classification scores, thereby calculating the cascade score of each sample image in each level of the cascade classifier.

Obviously, when the cascade classifier selects different cascade thresholds for each level, different judgment results are generated for the verified sample image. The smaller the cascade threshold, the lower the probability of miss detection (the presence of the object in the image is determined to be the absence of the object). However, the probability of false detection (the absence of the object in the image is determined to be the presence of the object) is increased. Specifically, if the cascade threshold is the minimum value (or smaller than the minimum value) of the cascading scores of all the verified sample images at this level, it is judged that all the verified sample images have the object at the level, thereby completely avoiding the miss detection.

In order to balance the miss detection and the false detection, in the object detection method according to this embodiment, the cascade threshold should be the maximum value allowing the miss detection rate is lower than a predetermined value (for example, 0.000005). In other words, the miss detection rate under different cascade thresholds can be calculated, and the maximum valve of the cascade threshold that can satisfy a condition of the miss detection rate is used as the cascade threshold of the corresponding level, thereby finally obtaining the cascade threshold of each level of the cascade classifier. The training process is completed.

After the training is completed, the trained classifiers can be used to form the cascade classifier to perform object detection on the actual image, including a step of:

S24, extracting features of the image.

In other words, according to the above method, the feature extraction may be performed on an image that needs to be subjected to object detection.

The step of performing the object detection on the actual image further includes: S25, assigning the image into a leaf node of the classifier, and using a node score of the leaf node as the classification score of the image in the classifier.

Herein the classifier includes a branch node and a leaf node, and each branch node is connected to a plurality of lower-level nodes.

For example, each branch node has two lower-level nodes, and the leaf node has no lower-level node. The branch node has a selection method of feature pair and a node threshold, configured to select a pair of features of the image according to the selection method of feature pair, and compare a difference between the feature values of the pair of features to the node threshold, wherein if the difference between the feature values is greater than or equal to the node threshold, then the image is assigned into the right node of the lower level of the current branch node, otherwise the image is assigned into the left node of the lower level of the current branch node.

In other words, the image is classified by the classifier obtained by the above training. The image is assigned into a leaf node of the classifier, and the score of the leaf node is used as the classification score of the image in the classifier.

Specifically, the image first enters the first level of the branch node, and a pair of features (such as F1 and F2) are selected at this node from the image according to the selection method of feature pair. The difference DF between the feature values of the two features is compared to the node threshold, and the image is assigned into the left or right node of the lower level of the current branch node according to the relationship therebetween. At the lower level of node, the above process is repeated until the image enters a leaf node without any lower level of node.

The step of performing the object detection on the actual image further includes: S26, comparing the cascade score of the image at each level of the cascade classifier with a corresponding cascade threshold, wherein it is judged that there is an object in the image if all the cascade scores are greater than or equal to the corresponding cascade threshold, otherwise it is judged that there is no object in the image; and wherein the cascade classifier is composed of a plurality of classifiers cascaded in a predetermined order, and each level of the cascade score of the image in the cascade classifier is equal to a sum of the classification scores of the image at the level and previous levels.

In other word, the classification scores of the image in different classifiers are added to calculate the cascade scores of the images in the levels of the cascade classifiers, and the cascade scores are compared with the corresponding cascade thresholds, respectively, to judge the presence of the object in the image. Herein, if it is judged there is an object in the image for each level of the cascade classifier, the judgment result in the end is the presence of object in the image; and if it is judged that there is no object in the image for at least one level, the judgment result in the end is the absence of object in the image.

Obviously, since the judgment result in the end is the absence of object in the image as long as it is judged that there is no object in the image for only one level of the cascade classifier, the above judgment processes can be performed step by step. In other words, the cascade scores of the images at each level of the cascade classifier are sequentially calculated, and the judgment is made each time the cascade score is obtained. If the judgment result is the presence of object, the calculation of the next level is continued; if the judgment result is the absence of object, the subsequent process is stopped to directly provide the judgment result of the absence of object in the image to reduce the calculation amount.

An embodiment of the present disclosure further provides an object detection device, including:

an extractor, configured to extract features of an image; and a cascade classifier, including a plurality of classifiers, wherein each of the plurality of classifiers is configured to classify the image according to features of the image, and calculate a classification score of the image in each level of the classifiers of the cascade classifier according to a classification result, and the cascade classifier is configured to calculate, according to the classification score, a cascade score of the image in a corresponding level of the cascade classifier, compare the cascade score in the corresponding level with a cascade threshold of the corresponding level, and judge the presence of an object in the image according to a comparison result.

In some embodiments of the present disclosure, the classifier assigns the image into a leaf node of the classifier, with a node score of the leaf node as the classification score of the image in the classifier.

In some embodiments of the present disclosure, the classifier includes a branch node and a leaf node, and each branch node is connected to a plurality of lower-level nodes corresponding to the branch node. For example, each branch node has two lower-level nodes, and the leaf node has no lower-level nodes. The branch node has a selection method of feature pair and a node threshold, configured to select a pair of features of the image according to the selection method of feature pair, and compare a difference between the feature values of the pair of features to the node threshold, wherein if the difference between the feature values is greater than or equal to the node threshold, then the image is assigned into the right node of the lower level of the current branch node, otherwise the image is assigned into the left node of the lower level of the current branch node.

The cascade classifier is specifically configured to compare the cascade score of the image at each level of the cascade classifier with a corresponding cascade threshold. If all cascade scores are greater than or equal to the corresponding cascade threshold, then it is judged that there is an object in the image, otherwise it is judged that there is no object in the image. The cascade classifier is composed of a plurality of classifiers cascaded in a predetermined order, and each level of the cascade score of the image in the cascade classifier is equal to a sum of the classification scores of the image at the level and previous levels.

In some embodiments, the target detection device further includes:
a classifier trainer, configured to sequentially train a plurality of classifiers by using sample images, wherein the sample images include a plurality of positive sample images having the object and a plurality of negative sample images having no object; and
a cascade classifier trainer, configured to form the plurality of classifiers into the cascade classifier according to an order of training, and to calculate a cascade threshold of each level of the cascade classifier according to a verified sample image having the object.

The so-called extractor, cascade classifier, classifier trainer, and cascade classifier trainer as stated above can be implemented by circuits designed to perform these corresponding functions, such as FPGA (Field Programmable Logic Array), ASIC (Application Specific Integrated Circuit), DSP (Digital Processor), NPU (Neural Network Processor), etc.; or can also be implemented by a processor with general-purpose computing functions, such as a CPU (Central Processing Unit), a GPGPU (General-Purpose Computing Graphics Processor), etc. In other words, the object detection device can execute operation commands to realize the functions of each module and each unit through a logic circuit having a logic operation function.

The object detection device according to this embodiment can execute the above-described object detection method, thereby providing the improved detection accuracy, fast detecting speed, and low amount of calculation.

An embodiment of the present disclosure also provides a driving assistance device, including any of the object detection devices as described above. The driving assistance device may further include a camera, a processor, and a memory, for example. The processor can be integrated together with a navigation system or a zoom system in a structure such as a central control panel, a rear view mirror, or a driving recording device. Here, the driving assistance device further includes an auxiliary driving device for driver. Further, the driving assistance device further includes an auxiliary device in a driverless vehicle, for example.

An embodiment of the present disclosure also provides an electronic device including: a housing, a processor, a memory, a circuit board, and a power supply circuit, wherein the circuit board is disposed inside a space enclosed by the housing, and the processor and the memory are disposed on the circuit board; the power supply circuit is configured to supply power to various circuits or devices of the above electronic device; and the memory is configured to store executable program code, and
the processor performs following steps by reading the executable program code stored in the memory and operating computer instructions corresponding to the executable program code:
extracting features of an image;
classifying the image according to features of the image, and calculating a classification score of the image in each level of the classifiers of the cascade classifier according to a classification result, and
calculating, according to the classification score, a cascade score of the image in a corresponding level of the cascade classifier, comparing the cascade score in the corresponding level with a cascade threshold of the corresponding level, and judging the presence of an object in the image according to a comparison result.

Herein, the memory may be implemented by any type of volatile or non-volatile storage device or a combination thereof, such as Static Random-Access Memory (SRAM), Electrically Erasable Programmable Read Only Memory (EEPROM), Erasable Programmable Read Only Memory (EPROM), Programmable Read Only Memory (PROM), Read Only Memory (ROM), Magnetic Memory, Flash Memory, Disk or Optical Disk.

Herein, the processor may be a logical computing device having data processing capabilities and/or program execution capabilities, such as a Central Processing Unit (CPU) or a Field Programmable Logic Array (FPGA) or a Microprogrammed Control Unit (MCU) or a Digital Signal Processor (DSP) or an Application Specific Integrated Circuit (ASIC) or a Graphics Processing Unit (GPU). The one or more processors may be configured to simultaneously execute the calculation method similar to the above in a processor group that is concurrently calculated, or configured to execute the above method with a partial processor.

Herein, the computer instructions include one or more processor operations defined by an instruction set architecture corresponding to the processor, the computer instructions being logically included and represented by one or more computer programs.

It is readily to understand that the electronic device can be also in connection with various input devices (such as a user interface, a keyboard, etc.), various output devices (such as speakers, etc.), and display devices to implement interaction between the computer product and other products or users. The description thereof will be omitted herein.

The connection may be completed through a network connection, such as a wireless network, a wired network, and/or any combination of a wireless network and a wired network. The network may include a local area network, the Internet, a telecommunications network, an Internet of Things based Internet and/or telecommunications network, and/or any combination of the above networks, and the like. The wired network can be communicated by, for example, twisted pair, coaxial cable or optical fiber transmission. For example, the wireless network can use a 3G/4G/5G mobile communication network, Bluetooth, Zigbee or Wi-Fi.

It is to be understood that the above embodiments are merely exemplary embodiments employed to explain the principles of the present disclosure, but the present disclosure is not limited thereto. Various modifications and improvements can be made by those skilled in the art without departing from the spirit and scope of the disclosure, and such modifications and improvements are also considered to be within the scope of the disclosure.

The invention claimed is:

1. An object detection method, comprising steps of:
   extracting features of an image, wherein the extracting the features of the image includes converting the image into a standard image having a selected resolution and a color channel and extracting the features from the standard image using a feature extraction algorithm;
   classifying the image by each level of classifiers of a cascade classifier according to the features of the image, and calculating a classification score of the image in each level of the classifiers of the cascade classifier according to a classification result; and
   calculating, according to the classification score, a cascade score of the image in a corresponding level of the cascade classifier, comparing the cascade score in the corresponding level with a cascade threshold of the corresponding level, and judging the presence of an object in the image according to a comparison result wherein the cascade score of the image in each level of the cascade classifier is equal to a sum of classification scores of the image in current level and previous levels of the cascade classifier.

2. The object detection method according to claim 1, wherein the step of classifying the image by each level of classifiers of a cascade classifier, comprises:
   classifying the image by each level of classifiers of a cascade classifier in a random forest method.

3. The object detection method according to claim 2, wherein
   the step of classifying the image by each level of classifiers of a cascade classifier according to the features of the image and calculating a classification score of the image in each level of the classifiers of the cascade classifier according to a classification result, comprises: in the classifier, selecting through a branch node a pair of features of the image, comparing a difference between feature values of the pair of features with a selected node threshold, assigning the image into a lower-level node of the branch node, until the image is assigned into a leaf node of the classifier, and using a node score of the leaf node as the classification score of the image in the classifier; and
   the step of calculating, according to the classification score, a cascade score of the image in a corresponding level of the cascade classifier, comparing the cascade score in the corresponding level with a cascade threshold of the corresponding level, and judging the presence of an object in the image according to a comparison result, comprises: comparing the cascade score of the image in each level of the cascade classifier with a corresponding cascade threshold, and in the condition where all of the cascade scores are greater than or equal to the corresponding cascade threshold, determining that there is an object in the image.

4. The object detection method according to claim 3, wherein
   in the condition where the difference between the feature values is greater than or equal to the selected node threshold, the image is assigned into a lower-level right node of the branch node; and in the condition where the difference between the feature values is lower than the selected node threshold, the image is assigned into a lower-level left node of the branch node.

5. The object detection method according to claim 3, wherein, before extracting the features of the image, the method further comprises:
   sequentially training each of a plurality of classifiers by using sample images, wherein the sample images include a plurality of positive sample images having the object and a plurality of negative sample images having no object;
   forming the plurality of classifiers into the cascade classifier according to an order of training; and
   training the cascade classifier according to a verified sample image having the object.

6. The object detection method according to claim 5, wherein the training process for each classifier comprises:
   calculating a weight value of each of the sample images in the classifier;
   placing the sample image to a root node of the classifier, wherein a depth of the root node is 1;
   selecting an unprocessed node for processing the sample image, wherein a node score of the node and a weight value ratio of the positive sample image are calculated according to the positive sample image and the weight value of positive sample image the and the negative sample image and the weight value of negative sample image;
   in the condition where a depth of the node does not reach a predetermined value and the weight value ratio of the positive sample does not reach a preset condition, randomly extracting a plurality of pairs of features for each of the sample images in the node by using the same feature extraction method;
   selecting a pair from the plurality of pairs of features as a temporary feature pair to set a temporary threshold; in the condition where a difference between the feature values of the temporary feature pairs of the sample image in the node is greater than or equal to the temporary threshold, assigning the sample image into a right set; and in the condition where a difference between the feature values of the temporary feature pairs of the sample image in the node is less than the temporary threshold, assigning the sample image into a left set;
   calculating a temporary score of the image in the node according to the positive sample image and the weight value of positive sample image and the negative sample image and the weight value of the negative sample image in the left and right sets;
   dividing a left node and a right node in a lower level of the node, a depth of the lower level of the node being the depth of the node with 1 added; and using the selection method of the temporary feature pair corresponding to the maximum value of the temporary score as a selection method of a feature pair of the current node, and using the temporary threshold corresponding to the maximum value of the temporary score as a node threshold of the current node, to assign the sample image of the left set having the maximum value of the temporary score into a lower-level left node of the node, and to assign the sample image of the right set into a lower-level right node of the node; and repeating the above steps until the sample image is processed in all nodes.

7. The object detection method according to claim 6, wherein the weight value ratio of positive sample image is $$RATIO = \frac{WPS}{WPS + WNS},$$

and the node score is SCORE=max(−a, min(a, a×ln(RATIO/1−RATIO))), wherein a is a coefficient more than 0, WPS is a sum of the weight values of the positive sample images in the node, and WNS is a sum of the weight values of the negative sample images in the node;

the predetermined condition of the weight ratio of positive sample image is RATIO<TH1 or RATIO>1−TH1, wherein TH1 is the predetermined threshold; and the temporary score is SCORE2=|WLP−WLN−WRP+WRN|, wherein WLP is the sum of the weight values of the positive sample images in the left set, WLN is the sum of the weight values of the negative sample images in the left set, WRP is the sum of the weight values of the positive sample images in the right set, and WRN is the sum of the weight values of the negative sample images in the right set.

8. The object detection method according to claim 7, wherein in the training of the first classifier, an initial weight value of any positive sample images is set to be $$WP_1 = \frac{1}{2 \times NP},$$

and an initial weight value of any negative sample images is set to be $$WN_1 = \frac{1}{2 \times NN},$$

wherein NP is a total number of the positive sample images, and NN is a total number of the negative sample images; and in the training of the k-th classifier, the weight value of the sample image is calculated by a Boost algorithm, wherein k is greater than or equal to 2.

9. The object detection method according to claim 8, wherein in the training of the k-th classifier, the calculation of the weight value of the sample image by the Boost algorithm comprises calculating the weight value of the sample image by a SoftBoost algorithm, and further comprises:

calculating a speech right ALPHA of the k-1th trained classifier, ALPHA=MAX(−a,min(a,0.1×a×ln((1−ERRWT)/ERRWT))), wherein ERRWT is a sum of weighting errors ERRW of all the leaf nodes of the trained k-1th classifier, ERRW=ERR×(WPS+WNS), ERR=min(RATIO,1−RATIO);

calculating a detection score $H_k$ of the sample image in the training of the k-th classifier, $H_k = H_{k-1} + h_{k-1} \times ALPHA$, wherein $h_{k-1}$ is the classification score of the sample image in the k-1th trained classifier, $H_{k-1}$ is the detection score of the sample image in the k-1th trained classifier, and $H_1$ is 0;

for the positive sample image, setting the initial weight to be $WP'_k = \exp(-H_k)/NP/2$ in the training of the k-th classifier; for the negative sample image, setting the initial weight to be $WN'_k = \exp(H_k)/NN/2$ in the training of the k-th classifier;

calculating a sum $W'_k$ of the initial weights of all sample images in the training of the k-th classifier; and dividing the initial weight of each of sample images in the k-th classifier by the sum of the initial weights to obtain a weight value of each of sample images in the classifier.

10. The object detection method according to claim 7, wherein a=5.

11. The object detection method according to claim 5, wherein the step of training the cascade classifier according to a verified sample image having the object comprises:

obtaining the cascade threshold in each level of the cascade classifier according to the verified sample image having the object, and further comprises:

calculating a cascade score of each of verified sample images in each level of the cascade classifier; and obtaining the cascade threshold in each level of the cascade classifier, wherein the cascade threshold is a maximum value in the cascade thresholds allowing a miss detection rate of verified sample image at the corresponding level of the cascade classifier to be lower than a set value, and wherein the miss detection rate is a probability of judging there is no object in the verified sample image.

12. The object detection method according to claim 1, wherein the feature extraction algorithm comprises an HOG algorithm, an LUV color and an LBP algorithm.

13. An electronic device, comprising at least one processor configured to operate computer instructions to execute at least one step in the method according to claim 1.

14. A computer readable storage device, configured to store computer instructions operable by a processor, the computer instruction being executed by the processor to perform at least one step in the method according to claim 1.

15. An object detection device, comprising:

an extractor, configured to extract features of an image, including converting the image into a standard image having a selected resolution and a color channel and extracting the features from the standard image using a feature extraction algorithm; and a cascade classifier, including a plurality of classifiers, wherein each of the plurality of classifiers is configured to classify the image according to features of the image, and calculate a classification score of the image in each level of the classifiers of the cascade classifier according to a classification result, and the cascade classifier is configured to calculate, according to the classification score, a cascade score of the image in a corresponding level of the cascade classifier, compare the cascade score in the corresponding level with a cascade threshold of the corresponding level, and judge the presence of an object in the image according to a comparison result, wherein the cascade score of the image in each level of the cascade classifier is equal to a sum of classification scores of the image in current level and previous levels of the cascade classifier.

16. The object detection device according to claim 15, wherein
the classifier includes a plurality of branch nodes and a plurality of leaf nodes;
the branch node is configured to select a pair of features of the image, compare a difference between feature values of the pair of features with a set node threshold, and assign the image into a lower-level node of the branch node according to a comparison result; and
the leaf node is configured to calculate a node score at the leaf node of the image which is assigned into the leaf node as a classification score of the image in the classifier.

17. The object detection device according to claim 16, wherein
a lower-level node corresponding to the branch node includes a lower-level right node and a lower-level left node; and
the branch node is configured to, in the condition where the difference between the feature values is greater than or equal to the set node threshold, assign the image into the lower-level right node of the branch node; and in the condition where the difference between the feature values is lower than the selected node threshold, the image is assigned into the lower-level left node of the branch node.

18. The object detection device according to claim 15, wherein
the cascade classifier is formed by cascading a plurality of classifiers in a predetermined order.

19. A driving assistance device, comprising the object detection device according to claim 15.

* * * * *